United States Patent Office 2,840,589
Patented June 24, 1958

2,840,589
DI(3-ISOCYANATO-4-METHYLPHENYL) CARBODIIMIDE

Kenneth C. Smeltz, Wilmington, Del., assignor to E. I. du Pont de Nemours and Company, Wilmington, Del., a corporation of Delaware No Drawing. Application June 14, 1957
Serial No. 665,631

1 Claim. (Cl. 260—453)

This invention is directed to a new compound, di(3-isocyanato-4-methylphenyl)carbodiimide.

Carbodiimides such as diphenylcarbodiimide are well known. The art is summarized in Chemical Reviews, 53, pp. 145–166 (1953) and in Chemistry of Carbon Compounds, vol. III–A, Elsevier Publishing Company, 1954, p. 205. In general, these carbodiimides have been prepared by treating a disubstituted thiourea with a metallic oxide, such as mercuric oxide, or with an aqueous alkaline solution of a hypohalite. These carbodiimides do not contain isocyanate groups. Furthermore, they tend to be contaminated with diphenylureas formed by the reaction of the carbodiimide linkage with water given off during the oxidation, e. g., $$C_6H_5-N=C=N-C_6H_5 + H_2O \longrightarrow$$

$$[C_6H_5-NH-\underset{OH}{\overset{|}{C}}=N-C_6H_5] \longrightarrow C_6H_5-NH-\underset{}{\overset{O}{\overset{\|}{C}}}-NH-C_6H_5$$

It is an object of this invention to provide a new kind of carbodiimide which is substituted by isocyanate groups.

The present invention is directed to the compound di-(3-isocyanato-4-methylphenyl)carbodiimide having the structural formula

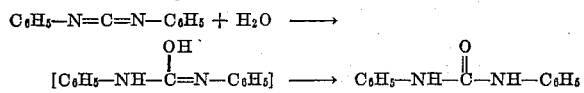

The compound of the present invention is prepared by treating a petroleum ether solution of toluene-2,4-diisocyanate at about 0–30° C. with a catalytic amount of 1-ethyl-3-methyl-3-phospholine-1-oxide. The carbodiimide is formed with the evolution of carbon dioxide according to the following reaction:

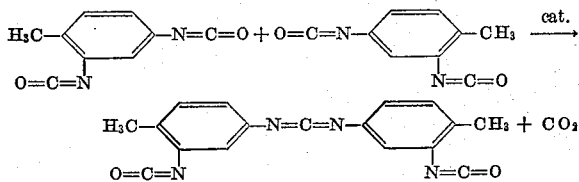

and precipitates from solution.

The methyl group in the 1-position of toluene-2,4-diisocyanate exerts a shielding effect on the adjacent isocyanate group, so that under the reaction conditions employed here, this isocyanate group has little chance to react. The di(3-isocyanato-4-methylphenyl)carbodiimide initially formed is so insoluble in the hydrocarbon solvent that it precipitates before the hindered isocyanate groups can react and give rise to polymeric product.

Before the reaction is begun toluene-2,4-diisocyanate is dissolved in petroleum ether to give about a 30% (by weight) solution. The solvent employed should be one which can dissolve the diisocyanate but not the carbodiimide at temperatures ranging from about 0–30° C. The solvent must be free from groups which are reactive with isocyanates, for example, groups containing active hydrogen atoms as determined by the Zerewitinoff procedure (J. Am. Chem. Soc., 49, 3181 (1927)). The solvent must be free from impurities which will react with isocyanates; it should be free from impurities which can tie up the phospholine catalyst as an inactive complex. Petroleum ether is the preferred solvent. Aromatic hydrocarbons such as benzene are less suitable because they maintain the carbodiimide in solution where it can polymerize.

The solution of toluene-2,4-diisocyanate is treated with agitation at about 0–30° C. by addition of 1-ethyl-3-methyl-3-phospholine 1-oxide. This catalyst is described in U. S. Patents 2,663,737 and 2,663,738. Approximately 0.1–10 parts of catalyst may be used for each 100 parts of toluene-2,4-diisocyanate. Generally, about 1–3 parts is preferred. When less than the preferred amount is used, the reaction occurs at a rather slow rate which is not convenient. It is not necessary to use more than about 3 parts to achieve a convenient reaction rate. Employment of more than 10 parts is not only uneconomical and wasteful but it may lead to the formation of polymeric by-products.

The reaction time will depend on the temperature selected. At 20–25° C. an hour is sufficiently long to achieve complete reaction. At temperatures below 20–25° C. the run will take a longer time. It is preferable to follow the progress of the reaction by collecting the carbon dioxide evolved. Since a mole of carbon dioxide is liberated for every two moles of toluene-2,4-diisocyanate which react, it is possible to tell when all the starting diisocyanate has been converted to di(3-isocyanato-4-methylphenyl)carbodiimide.

The precipitated di(3-isocyanato-4-methylphenyl)-carbodiimide is separated from the petroleum ether by filtration. The white solid microcrystalline material is purified by washing with a small amount of cold petroleum ether followed by recrystallization, in turn, from n-hexane and o-dichlorobenzene. The subject compound is finally obtained as white crystals melting about 113–115° C. It is soluble in benzene, chloroform, tetrahydrofuran and hot n-hexane.

The diurethane derivative made by reacting the subject compound with ethanol at 78° C. has an infrared spectrum which exhibits bands characteristic of the —NH— group at 3.07 microns, the —N=C=N— group at 4.70 (strong), and a urethane carbonyl group at 5.82 microns. Analysis of the derivative for C, H, and N content indicates that the —N=C=N— group is intact.

The subject compound is useful as an intermediate for preparing antistatic agents for textiles. For example, it can be reacted at a temperature below 100° C. with two moles of the monoethyl ether of polyethylene ether glycol (M.W.=550) to give a diurethane which can be applied to nylon at a temperature of about 150° C. to confer improved antistatic properties.

The following example illustrates the present invention.

Example 34.8 parts (0.2 mole) of water-white toluene-2,4-diisocyanate is dissolved with stirring in 66 parts of n-hexane at room temperature in a dry reaction vessel continually swept by a slow stream of dry nitrogen and protected from atmospheric moisture by a drying tube connected to the gas exit line. The temperature of the solution is adjusted to about 20° C.

0.25 part of 1-ethyl-3-methyl-3-phospholine 1-oxide is introduced in a single portion to the solution while agitation is continually maintained. Evolution of carbon dioxide soon begins. After about 15–20 minutes a precipitate starts to form. After about 5–10 minutes more a large amount of microcrystalline solid has separated. The reaction mixture is stirred for an additional 60 minutes at about 20–25° C.

The reaction mixture is filtered. The microcrystalline precipitate is collected, washed with a small amount of petroleum ether, and then recrystallized from n-hexane. The purified product melts at about 113–115° C.

*Analysis.*—Calcd. for $C_{17}H_{12}N_4O_2$: C, 67.1; H, 3.95; N, 18.4. Found: C, 67.5; H, 4.0; N, 18.1.

The di(3-isocyanato-4-methylphenyl)carbodiimide is soluble in benzene, chloroform, tetrahydrofuran, and hot n-hexane; it is slightly soluble in petroleum ether.

As many apparently widely different embodiments of this invention may be made without departing from the spirit and scope thereof, it is to be understood that this invention is not limited to the specific embodiments thereof except as defined in the appended claim.

The embodiments of the invention in which an exclusive property or privilege is claimed are defined as follows:

The compound:

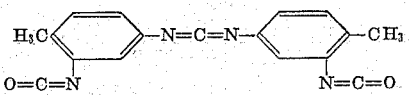

No references cited.